(12) United States Patent
Williams

(10) Patent No.: US 10,889,488 B2
(45) Date of Patent: Jan. 12, 2021

(54) MULTI-COMPARTMENT TANKER

(71) Applicant: Shiloh Williams, Upalco, UT (US)

(72) Inventor: Shiloh Williams, Upalco, UT (US)

( * ) Notice: Subject to any disclaimer, the term of this patent is extended or adjusted under 35 U.S.C. 154(b) by 15 days.

(21) Appl. No.: 16/285,006

(22) Filed: Feb. 25, 2019

(65) Prior Publication Data
US 2020/0270117 A1    Aug. 27, 2020

(51) Int. Cl.
*B67D 7/06* (2010.01)
*B60P 3/22* (2006.01)
*B60P 3/24* (2006.01)
*B67D 7/72* (2010.01)

(52) U.S. Cl.
CPC .............. *B67D 7/061* (2013.01); *B60P 3/225* (2013.01); *B60P 3/243* (2013.01); *B67D 7/72* (2013.01)

(58) Field of Classification Search
CPC ........... B67D 7/061; B67D 7/78; B60P 3/243
USPC ................ 137/205, 571, 572, 599.1, 565.23; 220/503, 564; 141/65, 231, 244
See application file for complete search history.

(56) References Cited

U.S. PATENT DOCUMENTS

| | | | | |
|---|---|---|---|---|
| 3,310,070 A * | 3/1967 | Black | | B60P 3/225 137/637.1 |
| 3,580,420 A * | 5/1971 | Kennedy | | B08B 9/0321 222/1 |
| 3,863,664 A * | 2/1975 | Holbrook | | A61M 1/0001 137/205 |
| 4,002,192 A * | 1/1977 | Mowatt-Larssen | | B65D 88/022 141/35 |
| 4,007,766 A * | 2/1977 | Hurst | | B65D 88/544 141/98 |
| 4,474,539 A * | 10/1984 | Wolf | | F04B 49/007 417/62 |
| 4,480,598 A * | 11/1984 | Berrigan | | F01P 11/029 123/41.27 |
| 4,818,399 A * | 4/1989 | Midkiff | | E02B 15/106 210/242.3 |
| 4,930,537 A * | 6/1990 | Farmer | | B60K 15/00 123/514 |
| 5,098,580 A * | 3/1992 | Andersen | | B67D 7/76 210/745 |
| 5,492,144 A * | 2/1996 | Kriewaldt | | B60P 3/2255 137/205 |
| 5,630,625 A * | 5/1997 | Shaw | | B60G 11/27 180/209 |
| 5,636,665 A * | 6/1997 | Lie | | B67D 7/78 141/1 |
| 5,637,233 A * | 6/1997 | Earrusso | | B01D 21/003 210/241 |
| 5,839,484 A * | 11/1998 | Engle | | A01J 7/00 141/65 |

(Continued)

*Primary Examiner* — Timothy L Maust
(74) *Attorney, Agent, or Firm* — Kunzler Bean & Adamson, PC

(57) ABSTRACT

Apparatuses, systems, and methods are disclosed for a multi-compartment tanker. An apparatus includes a first liquid storage tank and a second liquid storage tank. The apparatus includes one or more valves that connect the first liquid storage tank to the second liquid storage tank. The apparatus includes a vacuum pump that is connected to the first and second liquid storage tanks and operable for facilitating transfer of at least a portion of a liquid in the first liquid storage tank to the second storage tank in response to a valve connecting the first and second storage tanks being opened.

19 Claims, 5 Drawing Sheets

(56) References Cited

U.S. PATENT DOCUMENTS

| | | | | | |
|---|---|---|---|---|---|
| 6,159,362 | A | * | 12/2000 | Gilmore | B01D 17/0214 |
| | | | | | 137/398 |
| 6,997,204 | B2 | * | 2/2006 | Sansom | E03C 1/122 |
| | | | | | 137/14 |
| 7,651,624 | B2 | * | 1/2010 | Parr | B01D 17/0214 |
| | | | | | 15/340.1 |
| 8,579,332 | B2 | * | 11/2013 | Sonderegger | B60K 15/03 |
| | | | | | 280/834 |
| 9,689,248 | B2 | * | 6/2017 | Thiessen | B65D 88/027 |
| 10,101,751 | B2 | * | 10/2018 | Sonnenburg | B60P 3/2255 |
| 2005/0087236 | A1 | * | 4/2005 | Woo | F02M 21/0242 |
| | | | | | 137/572 |
| 2010/0230347 | A1 | * | 9/2010 | Haslem | B01D 17/0208 |
| | | | | | 210/523 |
| 2015/0259137 | A1 | * | 9/2015 | Houle | B65D 88/00 |
| | | | | | 220/562 |

* cited by examiner

MULTI-COMPARTMENT TANKER

FIELD

This invention relates to tankers and more particularly relates to a tanker that includes multiple compartments.

BACKGROUND

Tankers can be used to store and/or transport liquids such as oil. It can be difficult, however, to remove certain elements or substances from the liquid once it is in the tanker.

SUMMARY

An apparatus for a multi-compartment tanker is disclosed. A system and method also perform the functions of the apparatus. In one embodiment, an apparatus includes a first liquid storage tank and a second liquid storage tank. In some embodiments, the apparatus includes one or more valves that connect the first liquid storage tank to the second liquid storage tank. In various embodiments, the apparatus includes a vacuum pump that connects the first and second liquid storage tanks and is operable for facilitating transfer of at least a portion of a liquid in the first liquid storage tank to the second storage tank in response to a valve connecting the first and second storage tanks being opened.

In on embodiment, the apparatus includes one or more skim valves for each of the first and second liquid storage tanks. The one or more skim valves may be operable to remove a portion of the liquid from the first and second storage tanks in response to the vacuum pump acting on the first and second storage tanks.

In further embodiments, the first and second liquid storage tanks are configured to hold an oil liquid material comprising a plurality of different substances that are separable under gravity into a plurality of different layers. In one embodiment, the one or more valves that connect the first liquid storage tank to the second liquid storage tank are located at different vertical positions for pulling different substance layers from the oil liquid material from the first liquid storage tank and into the second liquid storage tank.

In one embodiment, the vacuum pump changes the pressure differential between the first and second liquid storage tanks by compressing the first storage tank and sucking air from the second storage tank to facilitate transfer of a liquid from the first liquid storage tank to the second liquid storage tank through a valve connecting the first liquid storage tank to the second liquid storage tank.

In certain embodiments, the vacuum pump changes the pressure differential between the first and second liquid storage tanks to a predefined threshold. The predefined threshold may be defined based on the liquid that is being transferred between the first and second storage tanks.

In various embodiments, the vacuum pump pressurizes the first liquid storage tank to a predefined pounds per square inch ("psi") to impregnate gaseous materials into a liquid within the first liquid storage tank. In some embodiments, the threshold psi is defined based on one or more of a type of liquid material in the first liquid storage tank and an amount of gaseous material to be impregnated into the liquid within the first liquid storage tank.

In one embodiment, the vacuum pump sucks air out of the first liquid storage tank to generate a vacuum within the first liquid storage tank and draw gases from the liquid within the first liquid storage tank. In certain embodiments, the one or more valves that connect the first liquid storage tank to the second liquid storage tank are remotely controllable. In certain embodiments, the one or more valves comprise smart valves that are wirelessly controllable by a computing device over a short-range wireless communication network.

In some embodiments, the apparatus includes a third liquid storage tank that is connected to one or more of the first liquid storage tank and the second liquid storage tank by one or more valves.

A system for a multi-container tanker is disclosed. The system, in one embodiment, includes a mobile tank trailer. In one embodiment, the mobile tank trailer includes a first liquid storage tank and a second liquid storage tank. In some embodiments, the mobile tank trailer includes one or more valves that connect the first liquid storage tank to the second liquid storage tank. In various embodiments, the mobile tank trailer includes a vacuum pump that connects the first and second liquid storage tanks and is operable for facilitating transfer of at least a portion of a liquid in the first liquid storage tank to the second storage tank in response to a valve connecting the first and second storage tanks being opened.

In one embodiment, the system includes a manifold connected to the mobile tank trailer and coupled to the vacuum pump. The manifold may direct air movement between the vacuum pump and the first and second liquid storage tanks. In certain embodiments, the system includes a fluid pump connected to the mobile tank trailer and operable for pumping liquids into and out of the first and second liquid storage tanks. The fluid pump may maintain a vacuum on one or more of the first and second liquid storage tanks while transferring liquids from one or more of the first and second liquid storage tanks.

In some embodiments, the system includes one or more skim valves that are coupled to the first and second liquid storage tanks. The one or more skim valves may be operable to remove a portion of the liquid from the first and second storage tanks in response to the vacuum pump acting on the first and second storage tanks.

In various embodiments, the system includes a third liquid storage tank that is connected to one or more of the first liquid storage tank and the second liquid storage tank by one or more valves. In further embodiments, the first and second liquid storage tanks and the one or more valves connecting the first and second liquid storage tanks are enclosed to form a single component of the tank trailer.

A method for using a multi-compartment tanker is disclosed. In one embodiment, the method includes pumping a liquid from an external site into a first liquid storage tank. In certain embodiments, the method includes pressurizing the first liquid storage tank and sucking air out of a second liquid storage tank using a vacuum pump coupled to the first and second liquid storage tank. In some embodiments, the method includes opening one or more valves connecting the first liquid storage tank to a second liquid storage tank such that at least a portion of the liquid in the first liquid storage tank transfers to the second liquid storage tank through the open one or more valves that connect the first liquid storage tank to the second liquid storage tank in response to the vacuum pump acting on the first and second liquid storage tanks.

In one embodiment, the liquid material comprises a plurality of different substances that are separable under gravity into a plurality of different layers within the first liquid storage tank. In certain embodiments, the one or more valves that are opened are positioned at vertical locations that correspond to one or more substance layers of the liquid such that when the one or more valves are opened the one or more substance layers that correspond to the one or more open valves are transferred from the first liquid storage tank to the second liquid storage tank in response to the vacuum pump acting on the first liquid storage tank.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
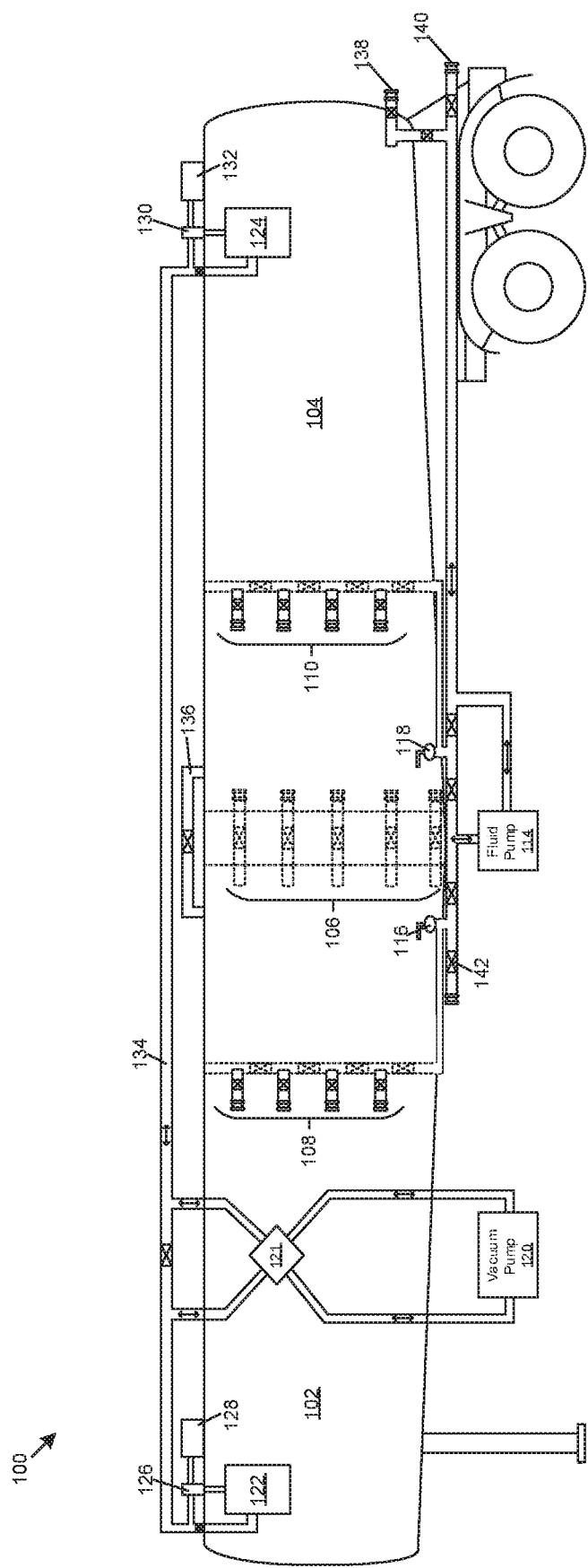
FIG. 1 is a perspective view illustrating one embodiment of a multi-compartment tanker in accordance with the subject matter described herein.

FIG. 1 depicts a perspective view of one embodiment of a tanker 100. The tanker 100 may be a mobile tanker such as a trailer tanker that can be towed. The tanker 100 may be a stationary tanker that is fixed at a location, e.g., at the site of an oil rig. The tanker 100 may be configured to store, hold, process, receive, and/or the like liquids such as oil, water, or the like, and gases. The liquid may include various substances. For instance, oil that is stored in the tanker 100 may include crude oil, condensate, and water. The different substances may be separable under gravity, e.g., as oil sits in the tanker 100 it may naturally separate into its constituent parts in layers with the heaviest layer (e.g., water) going to the bottom, and the lightest layer (e.g., condensate) going to the top with one or more intermediate layers in between (e.g., oil).

In one embodiment, the tanker 100 includes multiple different storage tanks 102, 104, compartments, and/or the like. For instance, the tanker 100 may include two storage tanks 102, 104 as depicted in FIG. 1. However, the tanker 100 may include three, four, or even more storage tanks 102, 104 in a single tanker 100. The storage tanks 102, 104 may be configured to hold liquid, as described above, and may be enclosed within the tanker 100 to form a single unit. In certain embodiments, the storage tanks 102, 104 are completely separate tanks located on the same trailer or at the same fixed location.

In one embodiment, the storage tanks 102, 104 are connected to one another by one or more valves 106. As used herein, a valve 106 is a device for controlling the passage of fluid or air through a pipe, duct, channel, etc. The valves 106 may include gate valves, globe valves, check valves, plug valves, ball valves, needle valves, pinch valves, pressure relief valves, butterfly valves, choke valves, diaphragm valves, knife valves, piston valves, solenoid valves, spool valves, and/or the like. In some embodiments, the valves 106 may be manually opened and closed using a control, handle, or the like that is accessible from an outside or exterior of the tanker 100. In some embodiments, the valves 106 may be remotely controllable using a device, e.g., a remote control, a smart phone, and/or other wireless device over a short-range wireless communication network such as Bluetooth®, near-field communication ("NFC"), or the like.

In certain embodiments, the valves 106 may be automatically opened and closed in response to a condition, signal, trigger, and/or the like. For example, the valves 106 may be opened in response to a predefined pressure on the valve 106 in the storage tank 102, 104 being satisfied. In certain embodiments, the valves 106 and/or other pipes along the tanker 100 may include backflow protectors 142 for allowing movement of liquids or gases in one direction only and prevent backflow of the liquids or gases. The backflow protectors 142 may be built into the valves 106 or may be components that are installed separately from the valves 106.

In one embodiment, as described above, the storage tanks 102, 104 hold oil that is separable into different substances that each form a layer within the storage tanks 102, 104. In certain embodiments, the valves 106 are positioned at different levels or vertical positions such that different layers of substances can be removed from one storage tank 102, 104 and moved into a different storage tank 102, 104.

For instance, one storage tank 104 may store an oil liquid that is separable into water (which is the heaviest, so it moves to the bottom of the storage tank 104), condensate, and crude oil (on the top). If a user wants to only get the crude oil from the storage tank 104, the lowest valve 106 that connects the storage tanks 102, 104 can be opened so that the crude oil can flow through the valve 106 and into the other storage tank 102. The user may monitor the substance flowing into the other storage tank 102 to determine when to close the valve 106 (e.g., when an undesired material starts to flow into the other storage tank 102). The valve 106 may be configured to close automatically based on the detecting an undesired or unrequested type of material flowing through it (e.g., if the user only wants crude oil and condensate begins to flow through, the valve 106 may detect the condensate and automatically close).

In one embodiment, the tanker 100 includes one or more skim valves 108, 110 for each of the storage tanks 102, 104. The skim valves 108, 110 may be the same type of valves as the valves 106 connecting the first and second storage tanks 102, 104. In some embodiments, the skim valves 108, 110 are used to remove a portion of the liquid from the storage tanks 102, 104 at a particular level or vertical position of the storage tanks 102, 104, as illustrated and described below with reference to FIG. 2. The skim valves 108, 110, for example, may be used to externally pull a portion of gas, water, condensate, crude oil, or the like from a storage tank 102, 104 in response to the vacuum pump 120 acting on (e.g., pressurizing) the storage tank 102, 104 where the liquid is being pulled from.

In one embodiment, the tanker 100 includes a fluid pump 114 for pumping fluid into and out of the storage tanks 102, 104. The fluid pump 114, as used herein, may include a centrifugal pump, a positive displacement pump (e.g., a reciprocating pump, a rotary lobe pump, a progressing cavity pump, a rotary gear pump, a piston pump, a diaphragm pump, a screw pump, a gear pump, a vane pump, a peristaltic hose, or the like), and/or the like. The type of fluid pump 114 that is used may be based on the type of liquid that is being pumped, the distance for moving the liquid, and/or the like.

Thus, the fluid pump 114 may be used to pump fluids from an external location (e.g., an oil well or oil site) through one or more valves/pipes 138, 140 and into one or both of the storage tanks 102, 104. In some embodiments, liquid is pumped into one tank 104 so that it's constituent parts can be separated and pulled individually from the storage tank 104 into the other storage tank 102 through the connecting valves 106. In certain embodiments, the fluid pump is used to pump fluids out of the tanks 102, 104 through external valves/pipes 116, 118.

The vacuum pump 120, in one embodiment, is connected to the storage tanks 102, 104, via a series of pipes 134, manifolds 121, and/or the like, and operable for facilitating transfer of at least a portion of a liquid in one storage tank 102, 104 to a different storage tank 102, 104 in response to a valve 106 that connects the storage tanks 102, 104 being opened. The vacuum pump 120, as used herein, may be a device that removes gas molecules from a sealed volume, e.g., the storage tanks 102, 104 in order to leave behind a partial vacuum. The vacuum pump 120, in certain embodiments, can also be used to pump air into a storage tank 102, 104, as needed, to pressurize or compress the storage tank 102, 104. The vacuum pump 120 may include a positive displacement pump, a momentum pump, a regenerative pump, an entrapment pump, or the like.

In one embodiment, if there is liquid in a storage tank 102, 104, the vacuum pump 120 may be used to generate a vacuum in the storage tank 102, 104 and remove gases from the liquid. For example, the vacuum pump 120 may be used to put a tank of oil in a vacuum to degas the oil. The gasses may be removed from the storage tank 102, 104, transferred to another storage tank 102, 104, and/or the like, using one or more outlets 136. In certain embodiments, the fluid pump, e.g., a gear pump can maintain a vacuum once it starts transferring a liquid out of the storage tanks 102, 104.

In certain embodiments, the vacuum pump 120 may be used to change a pressure differential between the storage tanks 102, 104. For instance, the vacuum pump 120 may pressurize a storage tank 102, 104 that has liquid in it while at the same time suck air out of a different storage tank to generate a vacuum in the different storage tank 102, 104 to facilitate the transfer, movement, and/or flow of liquid from one storage tank 102, 104 to another storage tank 102, 104 when one or more of the valves 106 are opened.

For example, if one storage tank 102 has oil in it that has been separated into multiple different layers, and a user wants to transfer one of the layers from the storage tank 102 to a different storage tank 104, the vacuum pump 120 would place the the storage tank 102 with the liquid under pressure and suck air from the storage tank 104 where the liquid layer is being transferred to generate a vacuum in the storage tank 104 and the valve 106 between the storage tanks 102, 104 that corresponds to the layer being transferred would be opened such that the layer flows through the valve 106 from the storage tank 102 that comprises the layer to the different storage tank 104.

In such an embodiment, the vacuum pump 120 changes the pressure differential between the storage tanks 102, 104 to a predefined threshold, e.g., a predefined atmospheric pressure, pounds per square inch ("psi"), inches of mercury, or the like. The threshold pressure differential, in certain embodiments, may be based on the type of liquid, material, substance, or the like that is being transferred from one storage tank 102, 104 to the other storage tank 102, 104. For instance, the threshold pressure differential may be higher for moving heavier substances, e.g., water, than lighter substances, e.g., oil.

In various embodiments, the vacuum pump 120 may be used to pressurize or compress a storage tank 102, 104 that comprises a liquid in order to impregnate the liquid with gaseous materials, e.g., to insert gaseous materials into an oil or other liquid within the storage tank 102, 104. The vacuum pump 120 may pressurize or compress the storage tank 102, 104 to a predefined threshold, e.g., psi, inches of mercury, or the like, based on the type of liquid material in the storage tank 102, 104 and/or the amount of gaseous material to be impregnated into the liquid material.

As part of the vacuum/pressure system, the vacuum pump 120 is connected to a manifold 121. In one embodiment, the manifold 121 comprises a device such as a pipe or channel into which smaller pipes or channels lead. The manifold 121 may be a 4-way, 6-way, 8-way, or the like manifold 121 that allows gases to be directed to different pipelines. Furthermore, different auxiliary vacuum pumps 122, 124, psi regulators 126, 130, pressure relief valves 128, 132, and/or the like may be used to regulate the vacuum/pressure system for the tanker 100.

Figure 2:
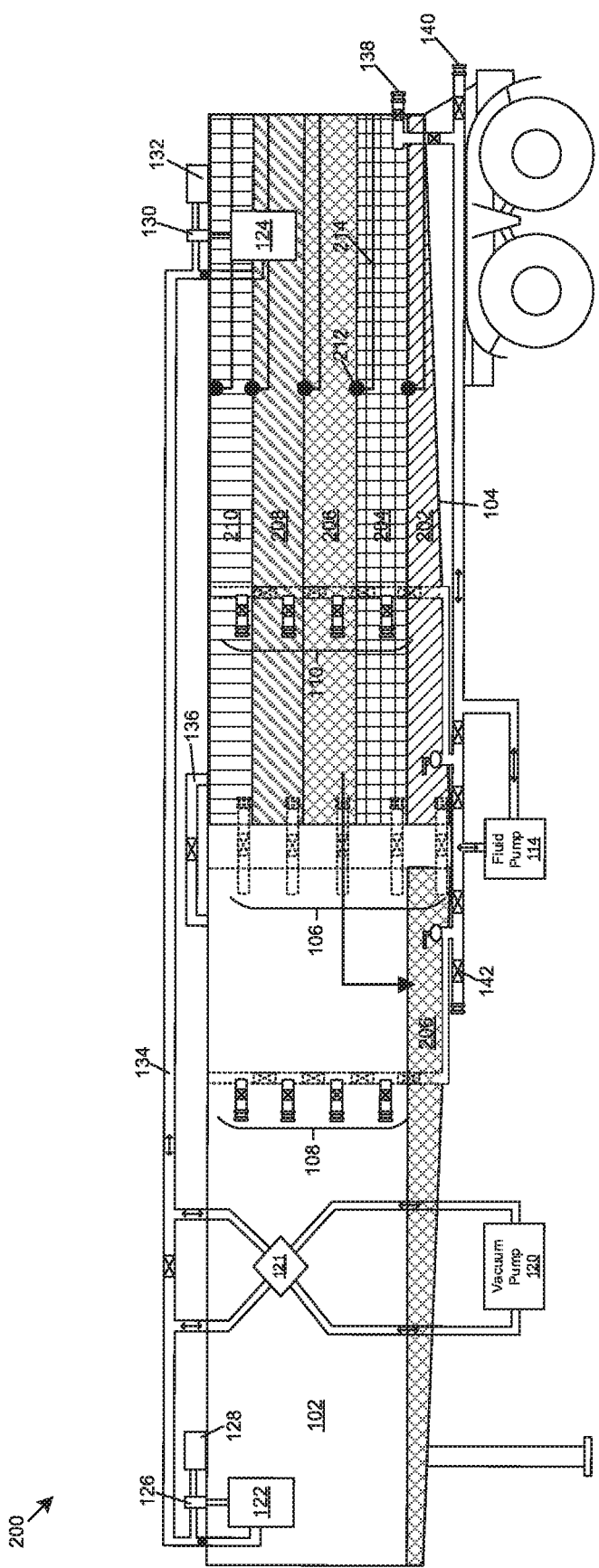
FIG. 2 is a perspective view illustrating one embodiment of another multi-compartment tanker in accordance with the subject matter described herein.

FIG. 2 depicts a perspective view of one embodiment of another tanker 200 that includes liquids in one storage tank 104. In one embodiment, the liquid has been separated into different layers 202-210, e.g., due to gravity such that the heaviest layers move to the bottom of the storage tank 104 and the lightest layers stay on the top of the storage tank 104. If a user wants to transfer the middle layer 206 to the other storage tank 102 to isolate the middle layer 206, the vacuum pump 120 may be actuated to pressurize or compress the storage tank 104 that includes the liquid while at the same time sucking air from the empty storage tank 102 to generate a vacuum in the empty storage tank 102. The valve 106 between the storage tanks 102, 104 that corresponds to the middle layer 206 may then be opened such that the middle layer 206 is transferred to the empty storage tank 102 due to the pressure differential between the storage tanks 102, 104. In this manner, different portions of liquids, such as different parts of oil, can be isolated and removed from the liquid using one or more vacuum pumps 120.

In one embodiment, the storage tanks 102, 104 include float balls 212 for gauging the how high, how full, or the level of a particular liquid in the storage tank 102, 104. As used herein, float balls 212 may be spherical, cylindrical, oblong or similarly shaped objects, made from either rigid or flexible material, that are buoyant in water and other liquids.

In certain embodiments, the float balls 212 are weighted or otherwise configured for a particular liquid such as oil, water, condensate, or the like such that one float ball 212 can float higher than a different float ball 212 depending on the liquid that it is configured for. For instance, a float ball 212 for measuring the level of water in the tank may be weighted to rise with water in the storage tank 104 while a float ball 212 for measuring the oil level in the storage tank 104 may be weighted to only rise with the oil level and not with other liquids in the storage tank 104.

In such an embodiment, the float balls 212 may be coupled to a gauge along a measurement line 214, e.g., a rod or cable, that specifies the level of the float ball 212 and the corresponding liquid that it is measuring. In certain embodiments, the float balls 212 may comprise smart float balls that are wirelessly connected to a user's device, e.g., a user's smart phone or tablet, to provide the corresponding level of the liquid that the float ball 212 is being used to measure. Furthermore, the float balls 212 may be coupled to a valve or other outlet that is configured for controlling the level of a liquid in the storage tank 104 such that if the level of the liquid gets to a certain level, as indicated by a float ball 212, then a valve 106, 110, 118 may be opened to release at least some of the liquid until the float ball 212 returns to a predetermined position.

Other level measurement systems may be used to determine and monitor the level of a liquid in a storage tank 102, 104. For example, a guided wave radar system uses low amplitude, high-frequency pulses along a waveguide or probe that is submersed in a liquid to identify reflection points that indicate a point of discontinuity between liquid layers, and consequently the levels of the liquid layers. Other examples may include continuous float level transmitters, differential pressure transmitters, load cells, radar level transmitters, radio frequency or radio frequency capacitive level transmitters, ultrasonic level transmitters, laser level transmitters, magnetostrictive level transmitters, glass or transparent level gauge, displacers, bubblers, magnetic level gauges, and/or the like. A combination of any of the foregoing level measurement devices may be used to determine the levels of one or more liquids in the storage tanks 102, 104.

Figure 3:
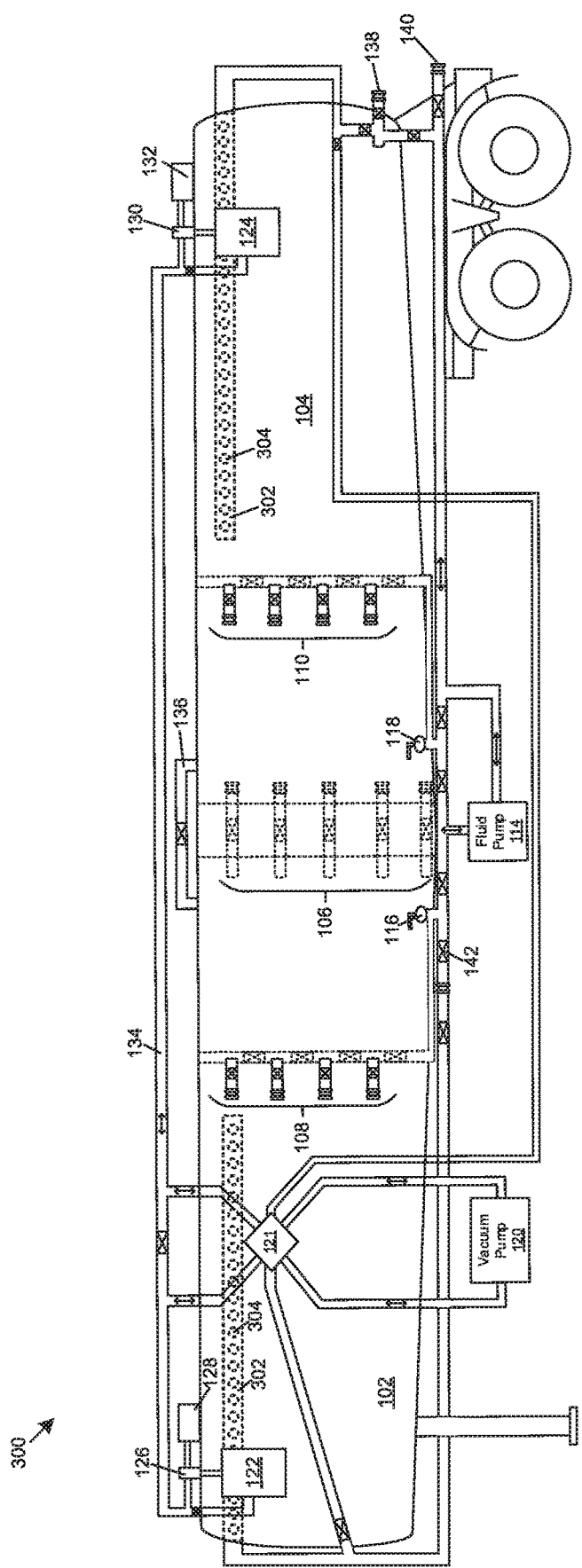
FIG. 3 is a perspective view illustrating one embodiment of another multi-compartment tanker in accordance with the subject matter described herein.

FIG. 3 depicts a perspective view of one embodiment of another tanker 300. In one embodiment, the tanker 300 includes one or more gun lines 302 for each storage tank 102, 104 of the tanker 300. As used herein, a gun line 302 is a pipe that includes a plurality of perforations 304, jets, or other openings. In certain embodiments, a fluid such as water is pumped through the gun lines 302, under pressure that the vacuum pump 120 or fluid pump 114 provides, where it shoots out of the perforations 304 in the pipe. In such an embodiment, the perforations 304 may be located at different locations around the gun line 302 to provide full coverage of the storage tanks 102, 104. In this manner, the entire storage tank 102, 104 can be sprayed with the flued, e.g., water.

For example, dirty water (e.g., water that comprises dirt, sediment, scale, mud, rocks, gloves, rags, garbage, or other trash or other items) may be pumped into one storage tank 102, 104. The heavier items such as rocks, dirt, sediment, trash, and other items will fall to the bottom of the storage tank 102, 104. A valve 106 connecting the storage tank 102, 104 with the dirty water to the other (empty) storage tank 102, 104 may be opened to pull the water from the storage tank 102, 104 to the empty storage tank 102, 104 after the heavier items in the water have fallen to the bottom of the storage tank 102, 104, leaving the heavier items in the storage tank 102, 104. The gun line 302 for the dirty storage tank 102, 104 may be enabled to spray down the storage tank 102, 104 and flush the heavier items out of an unload valve 116, 118. In this manner, the storage tank 102, 104 is cleaned and ready for the next job. Similarly, if the water included oily material, the storage tank 102, 104 may be sprayed down using the gun line 302 to remove oil residue from the sides of the storage tank 102, 104.

Figure 4A:
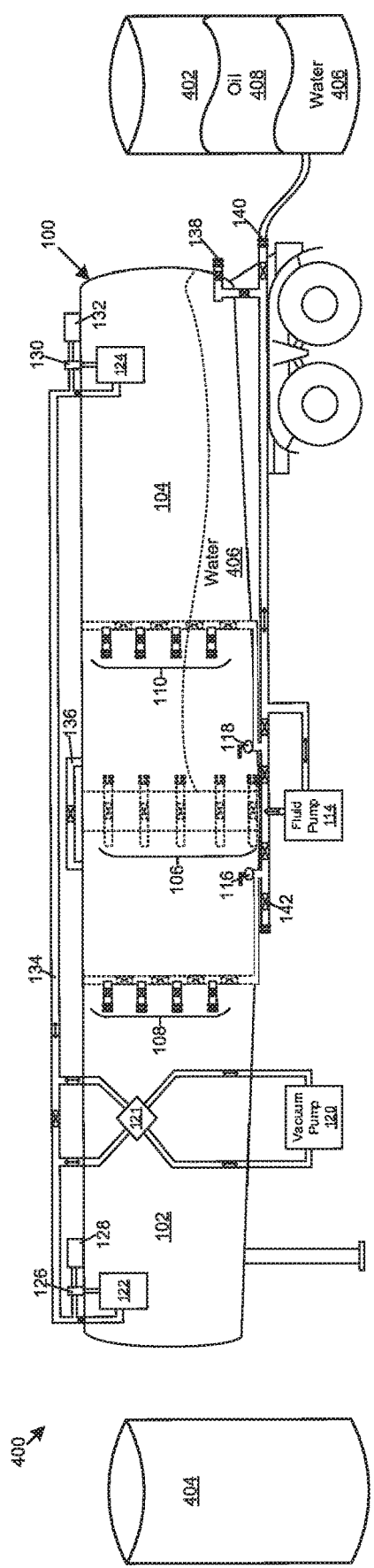
FIG. 4A depicts one embodiment of using a multi-compartment tanker in accordance with the subject matter described herein.
Figure 4B:
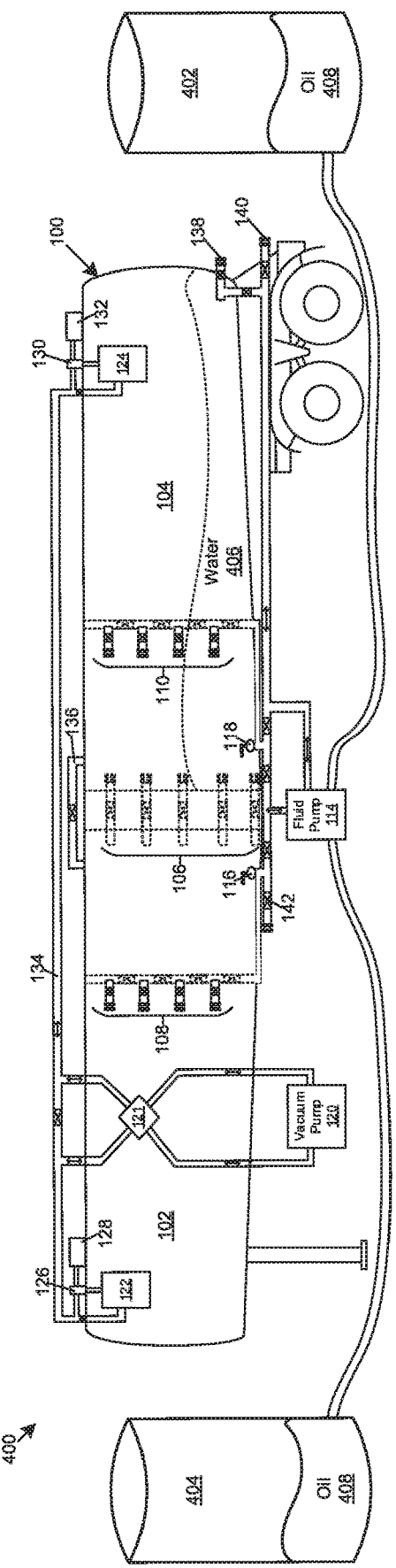
FIG. 4B depicts another embodiment of using a multi-compartment tanker in accordance with the subject matter described herein.

FIGS. 4A and 4B depict one embodiment 400 of using a multi-compartment tanker 100. In one embodiment, the tanker 100 may be pulled to a job site that includes two external storage tanks 402, 404. One of the external storage tanks 402 may be a production storage tank that holds a mixture of water 406 and oil 408. In certain embodiments, the water 406 can be sucked out of the external storage tank 402 and into a storage tank 104 on the tanker 100, leaving just the oil in the external storage tank 402, as shown in FIG. 4B. In certain embodiments, a transparent hose connection or valve 140 can be used to see when the liquid being pulled out of the external storage tank 402 changes from water 406 to oil 408. In certain embodiments, the valve 140 comprises a drain valve that can be opened to allow some of the liquid to drain into a bucket, for example, to see when the liquid being pulled out of the external storage tank 402 changes from water 406 to oil 408.

As depicted in FIG. 4B, when the water 406 changes to oil 408, the external storage tank 402 can be coupled to the fluid pump 114 on the tanker 100 and transferred to an external storage tank 404 that may be used for holding oil 408. In this manner, the tanker 100 can be used to remove the water 406 from the production storage tank 402 and load it into the tanker 100 to be disposed of elsewhere, while the remaining oil 408 can be transferred to the holding tank 404 using the fluid pump 114 on the tanker 100.

Figure 5:
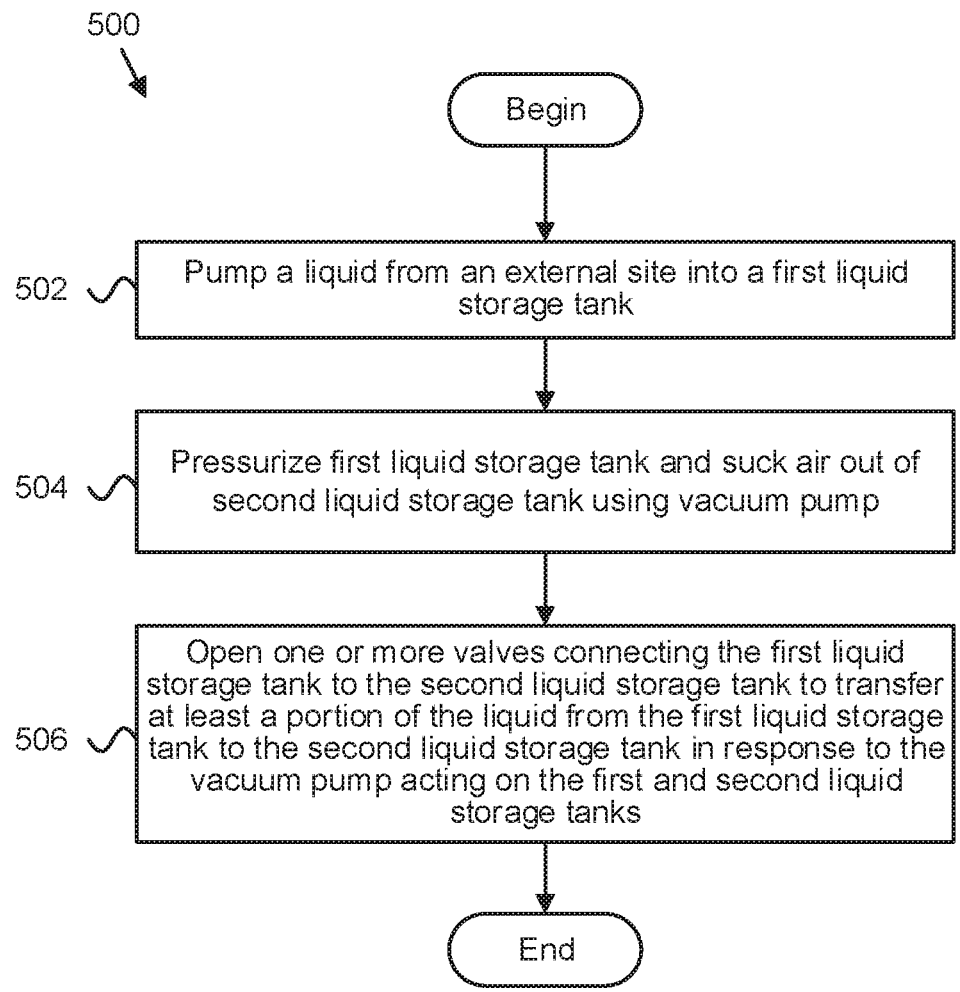
FIG. 5 is a schematic flow chart diagram illustrating one embodiment of a method for using a tanker in accordance with the subject matter described herein.

FIG. 5 is a schematic flow-chart diagram illustrating one embodiment of a method 500 of using a multi-compartment tanker. In one embodiment, the method 500 begins and pumps 502 a liquid from an external site into a first liquid storage tank 104. The method 500, in further embodiments, pressurizes 504 the first liquid storage tank 104 while sucking air out of a second liquid storage tank 102 using a vacuum pump 120. The method 500, in some embodiments, opens 506 one or more valves 106 connecting the first liquid storage tank 104 to a second liquid storage tank 102 to transfer at least a portion of the liquid from the first liquid storage tank 104 to the second liquid storage tank 102 in response to the vacuum pump 120 acting on the first and second liquid storage tanks 102, 104, and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a first liquid storage tank;
    a second liquid storage tank;
    one or more valves, the one or more valves connecting the first liquid storage tank to the second liquid storage tank; and
    a vacuum pump, the vacuum pump connected to the first and second liquid storage tanks and operable for facilitating transfer of at least a portion of a liquid in the first liquid storage tank to the second storage tank in response to a valve connecting the first and second storage tanks being opened, the vacuum pump simultaneously pressurizing the first liquid storage tank while sucking air from the second liquid storage tank to create a pressure differential between the first liquid storage tank and the second liquid storage tank to transfer the at least a portion of the liquid from the first liquid storage tank to the second liquid storage tank.

2. The apparatus of claim 1, further comprising one or more skim valves for each of the first and second liquid storage tanks, the one or more skim valves operable to remove a portion of the liquid from the first and second storage tanks in response to the vacuum pump acting on the first and second storage tanks.

3. The apparatus of claim 1, wherein the first and second liquid storage tanks are configured to hold an oil liquid material comprising a plurality of different substances that are separable under gravity into a plurality of different layers.

4. The apparatus of claim 3, wherein the one or more valves connecting the first liquid storage tank to the second liquid storage tank are located at different vertical positions for pulling different substance layers from the oil liquid material from the first liquid storage tank and into the second liquid storage tank.

5. The apparatus of claim 1, wherein the vacuum pump changes the pressure differential between the first and second liquid storage tanks to a predefined threshold, the predefined threshold defined according to the liquid that is being transferred between the first and second liquid storage tanks.

6. The apparatus of claim 1, wherein the vacuum pump pressurizes the first liquid storage tank to a predefined threshold pounds per square inch ("psi") to impregnate gaseous materials into a liquid within the first liquid storage tank.

7. The apparatus of claim 6, wherein the threshold psi is defined based on one or more of a type of liquid material in the first liquid storage tank and an amount of gaseous material to be impregnated into the liquid within the first liquid storage tank.

8. The apparatus of claim 1, wherein the vacuum pump sucks air out of the first liquid storage tank to generate a vacuum within the first liquid storage tank and draw gases from the liquid within the first liquid storage tank.

9. The apparatus of claim 1, wherein the one or more valves connecting the first liquid storage tank to the second liquid storage tank are remotely controllable.

10. The apparatus of claim 9, wherein the one or more valves comprise smart valves that are wirelessly controllable by a computing device over a short-range wireless communication network.

11. The apparatus of claim 1, further comprising a third liquid storage tank that is connected to one or more of the first liquid storage tank and the second liquid storage tank by one or more valves.

12. A system, comprising:
    a mobile tank trailer, the mobile tank trailer comprising:
        a first liquid storage tank;
        a second liquid storage tank;
        one or more valves, the one or more valves connecting the first liquid storage tank to the second liquid storage tank; and
        a vacuum pump, the vacuum pump connected to the first and second liquid storage tanks and operable for facilitating transfer of at least a portion of a liquid in the first liquid storage tank to the second storage tank in response to a valve connecting the first and second storage tanks being opened, the vacuum pump simultaneously pressurizing the first liquid storage tank while sucking air from the second liquid storage tank to create a pressure differential between the first liquid storage tank and the second liquid storage tank to transfer the at least a portion of the liquid from the first liquid storage tank to the second liquid storage tank.

13. The system of claim 12, further comprising a manifold connected to the mobile tank trailer and coupled to the vacuum pump, the manifold directing air movement between the vacuum pump and the first and second liquid storage tanks.

14. The system of claim 12, further comprising a fluid pump connected to the mobile tank trailer and operable for pumping liquids into and out of the first and second liquid storage tanks, the fluid pump maintaining a vacuum on one or more of the first and second liquid storage tanks while transferring liquids from one or more of the first and second liquid storage tanks.

15. The system of claim 12, further comprising one or more skim valves coupled to the first and second liquid storage tanks, the one or more skim valves operable to remove a portion of the liquid from the first and second storage tanks in response to the vacuum pump acting on the first and second storage tanks.

16. The system of claim 12, further comprising a third liquid storage tank that is connected to one or more of the first liquid storage tank and the second liquid storage tank by one or more valves.

17. The system of claim 12, wherein the first and second liquid storage tanks together with the one or more valves connecting the first and second liquid storage tanks are enclosed to form a single component of the tank trailer.

18. A method, comprising:
pumping a liquid from an external site into a first liquid storage tank;
pressurizing, simultaneously, the first liquid storage tank while sucking air out of a second liquid storage tank using a vacuum pump coupled to the first and second liquid storage tank to create a pressure differential between the first liquid storage tank and the second liquid storage tank to transfer at least a portion of the liquid from the first liquid storage tank to the second liquid storage tank; and
opening one or more valves connecting the first liquid storage tank to a second liquid storage tank, wherein at least a portion of the liquid in the first liquid storage tank transfers to the second liquid storage tank through the open one or more valves that connect the first liquid storage tank to the second liquid storage tank in response to the vacuum pump acting on the first and second liquid storage tanks.

19. The method of claim 18, wherein:
the liquid material comprises a plurality of different substances that are separable under gravity into a plurality of different layers within the first liquid storage tank; and
the one or more valves that are opened are positioned at vertical locations that correspond to one or more substance layers of the liquid such that when the one or more valves are opened the one or more substance layers that correspond to the one or more open valves are transferred from the first liquid storage tank to the second liquid storage tank in response to the vacuum pump acting on the first liquid storage tank.

* * * * *